US009888212B2

(12) United States Patent
Riedl et al.

(10) Patent No.: US 9,888,212 B2
(45) Date of Patent: *Feb. 6, 2018

(54) APPARATUS AND METHOD FOR VIDEO-ON-DEMAND PLAYLIST

(71) Applicant: Time Warner Cable Enterprises LLC, New York, NY (US)

(72) Inventors: Steven Riedl, Superior, CO (US); John Callahan, Broomfield, CO (US); Bryan Santangelo, Sand Springs, OK (US); Craig Mahonchak, Broomfield, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,626

(22) Filed: Apr. 7, 2017

(65) Prior Publication Data

US 2017/0280101 A1 Sep. 28, 2017

Related U.S. Application Data

(63) Continuation of application No. 11/953,179, filed on Dec. 10, 2007, now Pat. No. 9,621,855.

(51) Int. Cl.
*H04N 7/10* (2006.01)
*H04N 7/173* (2011.01)
(Continued)

(52) U.S. Cl.
CPC ....... *H04N 7/173* (2013.01); *H04N 21/26258* (2013.01); *H04N 21/4722* (2013.01); *H04N 21/47202* (2013.01); *H04N 21/84* (2013.01); *H04N 21/472* (2013.01); *H04N 21/812* (2013.01)

(58) Field of Classification Search
None
See application file for complete search history.

(56) References Cited

U.S. PATENT DOCUMENTS

| 7,073,189 B2 | 7/2006 | McElhatten et al. |
| 2002/0056119 A1 | 5/2002 | Moynihan |

(Continued)

OTHER PUBLICATIONS

OpenCable Spec. p. i-iv,1-24, "Enhanced TV Application Messaging Protocol 1.0; OC-SP-ETV-AM1.0-102-050727-plus-ECNs"; copyright 2004-2005 Cable Television Laboratories, Inc.

(Continued)

*Primary Examiner* — James R Marandi
(74) *Attorney, Agent, or Firm* — Otterstedt, Ellenbogen & Kammer, LLP

(57) ABSTRACT

A method of providing programming content from a video server to a client coupled to the video server by a video content network includes the steps of sending, to the client, a playlist describing an interrelationship between at least one program segment and at least one related segment; sending, from the video server to the client over the video content network, video content comprising the at least one program segment and the at least one related segment; and modifying the playlist via communication to the client. The steps of sending the playlist, sending the content, and modifying the playlist are all accomplished within a single video-on-demand session per user.

20 Claims, 7 Drawing Sheets

(51) Int. Cl.

| | |
|---|---|
| *H04N 7/16* | (2011.01) |
| *H04N 21/4722* | (2011.01) |
| *H04N 21/84* | (2011.01) |
| *H04N 21/262* | (2011.01) |
| *H04N 21/472* | (2011.01) |
| *H04N 21/81* | (2011.01) |

(56) References Cited

U.S. PATENT DOCUMENTS

| | | |
|---|---|---|
| 2002/0087972 A1 | 7/2002 | Cragun et al. |
| 2003/0056217 A1 | 3/2003 | Brooks |
| 2003/0084441 A1 | 5/2003 | Hunt |
| 2003/0208767 A1 | 11/2003 | Williamson et al. |
| 2003/0229899 A1 | 12/2003 | Thompson et al. |
| 2004/0045022 A1 | 3/2004 | Riedl |
| 2004/0103429 A1 | 5/2004 | Carlucci et al. |
| 2004/0163101 A1 | 8/2004 | Swix et al. |
| 2005/0018691 A1 | 1/2005 | Riedl et al. |
| 2005/0034171 A1 | 2/2005 | Benya |
| 2005/0039205 A1 | 2/2005 | Riedl |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0078840 A1 | 4/2005 | Riedl |
| 2005/0183111 A1 | 8/2005 | Cragun et al. |
| 2005/0235330 A1 | 10/2005 | O'Donnell et al. |
| 2005/0278761 A1 | 12/2005 | Gonder et al. |
| 2005/0289588 A1 | 12/2005 | Kinnear |
| 2006/0090186 A1 | 4/2006 | Santangelo et al. |
| 2006/0130120 A1 | 6/2006 | Brandyberry et al. |
| 2006/0218604 A1 | 9/2006 | Riedl et al. |
| 2006/0280437 A1 | 12/2006 | Logan et al. |
| 2007/0055983 A1 | 3/2007 | Schiller et al. |
| 2007/0245388 A1 | 10/2007 | Shen |
| 2007/0245391 A1 | 10/2007 | Pont |
| 2008/0005348 A1 | 1/2008 | Kosiba et al. |

OTHER PUBLICATIONS

OpenCable Guidelines p. i-vi,1-50, "Enhanced TV Operational Guidelines: OC-GL-ETV-OG-V01-060714"; copyright 2006 Cable Television Laboratories, Inc.

OpenCable Guidelines p. i-iv,1-24, "Enhanced TV User Interface Guidelines: OC-GL-ETV-UIG-V02-060418"; copyright 2005-2006 Cable Television Laboratories, Inc.

OpenCable Spec.p. i-xviii,1-402 "Enhanced TV Binary Interchange Format 1.0; OC-SP-ETV-BIF1.0-I04-070921"; copyright 2005-2007 Cable Television Laboratories, Inc.

Wikipedia, Sep. 11, 2007 p. 1-4 "Enhanced TV Binary Interchange Format", http://en.wikipedia.org/wiki/Enhanced_TV_Binary_Interchange_Format.

Wikipedia, Sep. 11, 2007 p. 1-2 "Enhanced Television", http://en.wikipedia.org/wiki/Enhanced_Television.

OpenCable ETV, Sep. 11, 2007 p. 1-2 CableLabs, "Enhanced Television (ETV) Overview", http://www.opencable.com/etv/etv_overview.html.

Oracle Video Streaming, May 12, 2008 p. 1-3, http://system.vccs.edu/its/projects/oracle/project/OVSModel.htm.

Gotuit Powervideo Suite Product Profile, CrunchBase,p. 1-2, http//www.crunchbase.com/product/gotuit-powervideo-suite (1 of 2), May 12, 2008.

Navic Networks: Technology, Admira Optimized Media, http://www.navic.tv/technology/index.php May 12, 2008 p. 1-2.

p. 1-4GoldPocket Interactive Created Broadband ITV Experience for TBS's New Comedy Series "Daisy Does America"; http://www.tandbergtv.com/newsview.ink?newsid=263; May 12, 2008.

Welcome to OpenTV; http://www.opentv.com/solutions/ondemand.htm; May 12, 2008, p. 1-2.

Welcome to OpenTV; OpenTV Participate Demo, http://www.opentv.com/products/participate.htm; May 12, 2008, p. 1-2.

CableLabs Video-on-Demand Content 1.0 Specification; MD-SP-VOD-CONTENT1.0-C01-041210, (c) 2002-2004 p. i-iv, 1-30.

Jack Brown, "ETV: SDP-3PF Opportunities," Hewlett-Packard, Jul. 10, 2007, pp. 1-16 office action dated Oct. 6, 2010 in parent U.S. Appl. No. 11/953,179.

FIG. 4A

```
<?xml version="1.0" encoding="UTF-8" ?>
<!--
  Segment    Type    NPT       Timecode       Title
  A          C       0         00:00:00.00    Xbox TonyHawk promo
  B          LA      20000     00:00:20.00    Castrol Car Care minute
  C          C       30000     00:00:30.00    Carl's Jr Breakfast Ad
  D          PA      40000     00:00:40.00    Carl's Jr Burger Ad
  E          TA      50000     00:00:50.00    DriverTV Ferrari
  F          C       70000     00:01:10.00    ITT-Tech
  G          PA      80000     00:01:20.00    TechTV's Cheat
  H          TA      90000     00:01:30.00    DriverTV Corvette
  I          C       100000    00:01:40.00    TechTV's Cheat
  J          LA      110000    00:01:50.00    Scion Ad
  K          C       120000    00:02:00.00    TechTV's Cheat
  L          PA      130000    00:02:10.00    AIG Ad
  M          C       140000    00:02:20.00    TechTV's Cheat
  N          C       150000    00:02:30.00    Xbox Full Auto Promo
-->
<Playlist totalNPT="160000" xmlns:xsi="http://www.w3.org/2001/XMLSchema-instance" xsi:noNamespaceSchemaLocation ="segments.xsd">
  <Segment type="entertainment" startNPT="0" endNPT="20000" id="A" name="P1" continuationRefID="B">
    <Rotations type="pause">
      <Rotation rotationRefID="G" />
      <Rotation rotationRefID="D" />
    </Rotations>
  </Segment>
  <Segment type="local" startNPT="20000" endNPT="30000" id="B" name="LA1" continuationRefID="C">
    <ChoicePoint npt="25000">
      <Choice choiceRefID="E">Test drive a Ferrari!</Choice>
      <Choice choiceRefID="H">Test drive a new Corvette!</Choice>
    </ChoicePoint>
  </Segment>
  <Segment type="entertainment" startNPT="30000" endNPT="40000" id="C" name="P2" continuationRefID="F">
    <Rotations type="pause">
      <Rotation rotationRefID="G" />
    </Rotations>
  </Segment>
  <Segment type="pause" startNPT="40000" endNPT="50000" id="D" name="PA1" />
  <ChoicePoint npt="40000">
    <Choice choiceRefID="H">Test drive a new Corvette!</Choice>
  </ChoicePoint>
  <Segment type="telescoping" startNPT="50000" endNPT="60000" id="E" name="TEL1" />
```

FIG. 4B

```xml
<Segment type="entertainment" startNPT="70000" endNPT="80000" id="F" name="P3" continuationRefID="I">
  <Rotations type="pause">
    <Rotation rotationRefID="G" />
    <Rotation rotationRefID="L" />
  </Rotations>
</Segment>
<Segment type="pause" startNPT="80000" endNPT="90000" id="G" name="PA2" />
<Segment type="telescoping" startNPT="90000" end NPT="100000" id="H" name="TEL2" />
<Segment type="local" startNPT="100000" endNPT="110000" id="I" name="P4" continuationRefID="J">
  <ChoicePoint npt="108000">
    <Choice choiceRefID="J">SCION Ad</Choice>
    <Choice choiceRefID="M">View TechTV's Cheat!</Choice>
  </ChoicePoint>
  <Rotations type="pause">
    <Rotation rotationRefID="D" />
  </Rotations>
</Segment>
<Segment type="local" startNPT="110000" endNPT="120000" id="J" name="LA2" continuationRefID="K">
  <Rotations type="pause">
    <Rotation rotationRefID="L" />
  </Rotations>
</Segment>                                                                      } 402
<Segment type="entertainment" startNPT="120000" endNPT="130000" id="K" name="P5">
  <Rotations type="pause">
    <Rotation rotationRefID="D" />
  </Rotations>
</Segment>
<Segment type="pause" startNPT="130000" endNPT="140000" id="L" name="PA3" />
<Segment type="entertainment" startNPT="140000" endNPT="150000" id="M" name="P6" continuationRefID="N" />
<Segment type="entertainment" startNPT="150000" endNPT="160000" id="N" name="P7">
  <ChoicePoint npt="155000">
    <Choice choiceRefID="K">View TechTV's Cheat!</Choice>
  </ChoicePoint>
  <Rotations type="pause">
    <Rotation rotationRefID="L" />
  </Rotations>
</Segment>
</Playlist>
```

| Segment | | |
|---|---|---|
| A | (CONTENT: P1) | 0-20 |
| B | (CONTENT: LA1) | 20-30 |
| C | (CONTENT: P2) | 30-40 |
| D | (ROTATION: PA1) | 40-50 |
| E | (CONTENT: TEL1) | 50-60 |
| F | (CONTENT: P3) | 70-80 |
| G | (ROTATION: PA2) | 80-90 |
| H | (CONTENT: TEL2) | 90-100 |
| I | (CONTENT: P4) | 100-110 |
| J | (CONTENT: LA2) | 110-120 |
| K | (CONTENT: P5) | 120-130 |
| L | (ROTATION: PA3) | 130-140 |
| M | (CONTENT: P6) | 140-150 |
| N | (CONTENT: P7) | 150-160 |

| SEGMENT | CONTINUATION SEGMENT | CHOICE POINT | CHOICE | ROTATIONS |
|---|---|---|---|---|
| A | B | | | G, D |
| B | C | 25 | E, H | NONE |
| C | F | | | G |
| D | | 40 | H | NONE |
| E | | | | NONE |
| F | I | | | G, L |
| G | | | | NONE |
| H | | | | NONE |
| I | J | 108 | J, M | D |
| J | K | | | L |
| K | END | | | D |
| L | | | | NONE |
| M | N | | | NONE |
| N | END | 155 | K | L | they appreciate at the fast-
APPARATUS AND METHOD FOR VIDEO-ON-DEMAND PLAYLIST

CROSS-REFERENCE TO RELATED APPLICATIONS

This application is a continuation, under 37 CFR 1.53(b), of co-assigned U.S. patent application Ser. No. 11/953,179 of inventors Steven Riedl et al., and claims the benefit thereof, said application Ser. No. 11/953,179 having been filed on Dec. 10, 2007, and entitled "APPARATUS AND METHOD FOR VIDEO-ON-DEMAND PLAYLIST." The complete disclosure of the aforesaid application Ser. No. 11/953,179 is expressly incorporated herein by reference in its entirety for all purposes.

FIELD OF THE INVENTION

The present invention relates generally to communications systems and methods, and, more particularly, to techniques for creating and managing playlists in a video-on-demand (VOD) system operating over a communications network such as, for example, a cable television network (or other content network), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA), and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

U.S. Pat. No. 7,073,189 of McElhatten, et al. is entitled "Program guide and reservation system for network based digital information and entertainment storage and delivery system." The disclosure of the aforesaid U.S. Pat. No. 7,073,189 of McElhatten, et al. is expressly incorporated herein by reference in its entirety for all purposes. A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Note that an NDVR can be distinguished from a DVR in that the latter, storage of programs and the like is local to the DVR, while in the former (NDVR) case, such storage is at the server or head end level.

US Patent Publication 2004/0103429 A1 of Carlucci et al. is entitled "Technique for delivering entertainment programming content including commercial content therein over a communications network." The disclosure of the aforesaid US Patent Publication 2004/0103429 A1 of Carlucci et al. is expressly incorporated herein by reference in its entirety for all purposes. The Carlucci et al. publication discloses that although personal video recorders (also known as digital video recorders) provide certain conveniences to viewers of programming content, such devices facilitate manipulation or "skipping" of commercials, frustrating the intent of the advertisers of the commercials. In accordance with the Carlucci et al. invention, when a user fast-forwards (or rewinds) a commercial, alternate commercial(s) may be accessed for display in place of the original commercial, which provides a full impression of the goods and service promoted, otherwise impossible to appreciate at the fast-forward (or rewind) speed. The duration of the alternate commercial(s) corresponds to the duration of the original commercial at the fast-forward (rewind) speed controlled by the user. With the Carlucci et al. invention, the user advantageously realizes the convenience of manipulating programming content, and at the same time can appreciate the full impression of an alternate commercial to the original commercial, albeit in a shorter duration.

US Patent Publication 2005/0060745 A1 of Riedl et al. is entitled "System and method for advertisement delivery within a video time shifting architecture." The disclosure of the aforesaid US Patent Publication 2005/0060745 A1 of Riedl et al. is expressly incorporated herein by reference in its entirety for all purposes. The Riedl et al. publication discloses systems and methods for creating a program for delivery to a client in a video time shifting architecture. The system of the Riedl et al. invention includes an advertisement selection system (ADS) operative to select one or more advertisements and transmit one or more identifiers that uniquely identify the selected advertisements and an advertisement management system (AMS) operative to generate a playlist that identifies content. The playlist includes a user requested time shifted program and the one or more selected advertisements. A video server is operative to interpret the playlist and deliver the content to the user.

SUMMARY OF THE INVENTION

Principles of the present invention provide techniques for creating and managing playlists in a video-on-demand (VOD) system operating over a communications network. In one aspect, an exemplary method of providing programming content from a video server to a client coupled to the video server by a video content network includes the steps of sending, to the client, a playlist describing an interrelationship between at least one program segment and at least one related segment; sending, from the video server to the client over the video content network, video content comprising the at least one program segment and the at least one related segment; and modifying the playlist via communication to the client. The steps of sending the playlist, sending the content, and modifying the playlist are all accomplished within a single video-on-demand session per user.

In some instances, the program segment and/or the related segment are acquired in real time by the video server during the modifying step. Further, in some instances, the playlist is sent from the video server to the client, over the video content network; and the playlist is specified at least by a multimedia content file multiplexed with the video content; for example, an enhanced television binary interchange format ("eBIF") resource. Still further, in some instances, the playlist is further specified by stream events, such as so-called "eTriggers." Yet further, in some instances, the playlist is modified by communication from the video server to the client over the video content network. Alternative approaches are also set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus, according to another aspect of the invention, can include a memory and at least one processor coupled to the memory. The processor can be operative to facilitate performance of one or more of the method steps described herein. Non-limiting examples of processors are those on a video server, an advertisement management system, a client such as a set top box, and the like. In still another aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments may have one or more of the following advantages: bandwidth savings, reduced session set-up times, enhanced user experience, resource savings (client and server need not engage in resource set-up), and fast channel changes (as actual tuning need not be performed at the set-top).

These and other features and advantages of the present invention will become apparent from the following detailed description of illustrative embodiments thereof, which is to be read in connection with the accompanying drawings.

BRIEF DESCRIPTION OF THE DRAWINGS

FIGS. 4A and 4B are a sample extensible markup language (XML) listing for an exemplary inventive playlist;

DETAILED DESCRIPTION OF PREFERRED EMBODIMENTS

Figure 1:
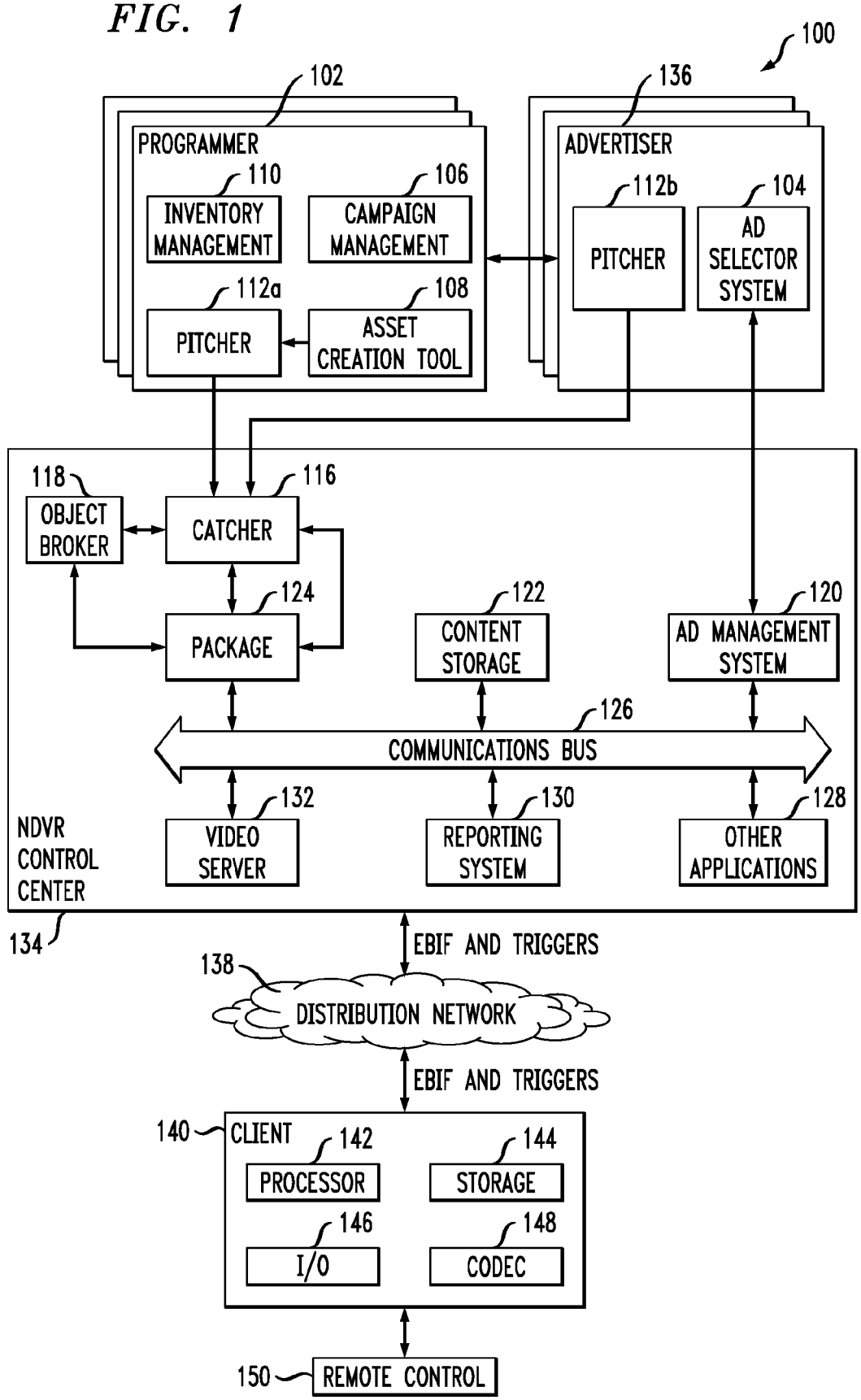
FIG. 1 is a block diagram presenting an exemplary configuration of hardware and software components within an NDVR architecture, which can implement one or more inventive techniques.
Figure 2:
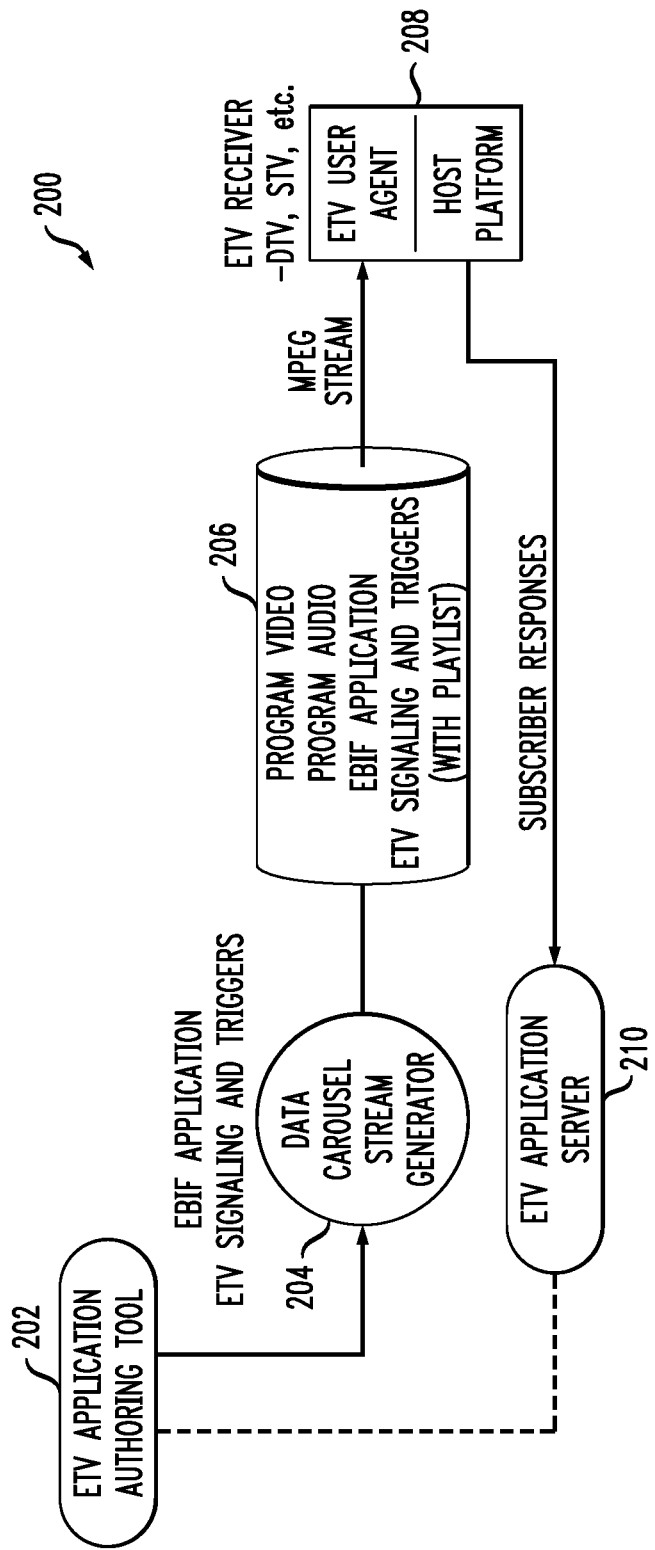
FIG. 2 presents a block diagram of an exemplary subsystem for providing an eBIF resource multiplexed with video, as well as enhanced television signaling and triggers, which may be combined with the elements of FIG. 1 to implement one or more inventive techniques.

FIGS. 1 and 2 depict one exemplary environment in which inventive techniques can be implemented. Reference should initially be had to FIG. 1, which is a block diagram presenting an exemplary system configuration 100 of hardware and software components within an NDVR architecture.

Typically, a plurality of programmers 102 are developing video programs for broadcast to consumers over various transmission media, such as, but not limited to, cable television, over-the-air broadcast, direct broadcast satellite, video and data networks such as the Internet, and other point to multipoint and multipoint to multipoint distribution systems.

A given programmer 102 creates an asset by using an asset creation tool 108. The asset creation tool 108 includes one or more software applications that the programmer 102 uses to generate the video asset. For example, where the programmer is creating an episode of a television program, such as a situation comedy, he or she employs the use of a number of video editing tools to modify the program video, such as to segment or otherwise splice the video for later insertion of advertising assets, and to encode the finished video for distribution to consumers. The programmer 102 employs an inventory management tool 110 to analyze the distribution demographics and determine the amount of advertising available.

The inventory management tool 110 informs the programmer 102 as to the amount of available advertising inventory (each instance of which is referred to as an "avail"). The programmer 102 communicates with one or more advertisers 136 to obtain advertising on the basis of this inventory, in other words, sell the avails to advertisers. The advertiser 136 identifies the substance and terms of the advertisement campaign as a set of metadata, e.g., a unique identifier, title, description, target audience, program in which the advertisement is to appear, day and/or time, etc., that it associates with the advertisement. The campaign management component 106 provides this functionality, which involves creating an advertising campaign out of available inventory. The advertiser 136 may package or format the metadata according to one or more data formatting languages known to those of skill in the art, for example, according to an eXtensible Markup Language (XML) schema. The system allows an advertiser to use an arbitrarily complex metadata to describe the program.

Various types of advertisements (ads) will be referred to herein. These include:

(i) pause, fast forward, and rewind ads—these are presented to the user when he or she invokes the corresponding functionality (pause, fast forward, or rewind);

(ii) bumper ads—inserted before or after a program;

(iii) replacement ads—substituted for "stale" ads in a time-delayed environment;

(iv) local ads—ads having local as opposed to national interest; and (v) telescoping ads—an ad which telescopes off a first ad (or off of other content). Such an ad may, but need not necessarily, provide additional details about the subject of the first ad. In situations other than live broadcasts, flow may return to the first ad when done.

The programmer 102 receives the advertisement and its metadata from the advertiser 136 and adds the advertisement to a campaign through use of the campaign management tool 106. A campaign includes a selection of advertisements and associated information as to the demographics to which the individual advertisements are to be shown. A programmer 102 uses the campaign manager 106 to package an advertisement for distribution by a distribution system, such as a cable television system. The programmer encodes the advertisement into a format suitable for distribution, such as the CableLabs VOD format, available at http://www.cablelabs.com/projects/metadata/downloads/CableLabs_VoD_Content_Specification_V1.0.pdf, which utilizes the MPEG-2 format, information regarding which is available at http://mpeg.telecomitalialab.com/standards/mpeg-2/mpeg-2.htm, both of which documents are incorporated herein by reference in their entirety for all purposes. Alternatively, the advertiser 136 may perform the encoding process on the advertisement and package it for delivery to the NDVR system.

The programmer 102 uses its distribution mechanism, such as a pitcher 112a, to transport the program to an NDVR control center 134 that provides NDVR functionality for one or more program or asset distribution systems. The NDVR control center 134 includes a receiving mechanism, such as catcher 116, which is in communication with pitchers from one or more programmers 102 or advertisers 136 to receive advertisement video and metadata for distribution. According to one embodiment of the pitcher/catcher metaphor, content is sent from the programmer's "pitcher" 112a via satellite to a "catcher" server device 116 positioned at the NDVR control center 114. Alternative methods include IP transmission over the Internet, possibly utilizing a VPN (Virtual Private Network), SSH (Secure Shell), SSL (Secure Sockets Layer) or other secure transmission methods.

One or more advertisers 136 also operate pitchers 112b that are in communication with the catcher 116 at the NDVR control center 134. In this manner, advertisers 136 may supply advertisements directly to the NDVR control center 134 for use, as is explained in greater detail herein, in conjunction with NDVR functionality such as pause advertisements and bumper advertisements appended and prepended to programs that a consumer requests. The catcher 116 also generates one or more packages 124 from the advertisements that it receives directly from advertisers 136.

When the catcher 116 receives new assets, it passes a request to an object broker 118 to instantiate a new data structure or software object for storage of the asset and its metadata. In some instances, the object broker 118 is a Common Object Request Broker Architecture (CORBA) interface that provisions the package 124 according to the components that include the asset, e.g., one or more advertisements, teaser videos, graphics stills or other content items.

The NDVR control center 134 includes a communications bus 126 over which the NDVR control center's various components communicate, which is simply one embodiment of a software method for implementing inter-component messaging. The object broker 118 instantiates one or more packages 124, e.g., data structures or objects to maintain assets and metadata, which it passes to content storage 122 for persistent storage. The content storage utilizes one or more types of data stores known to those of skill in the art including, but not limited to, a relational database, an object-oriented database, and/or a hybrid object-relational database; other data stores include files in a video-optimized file system or a typical file system well known to those of skill in the art. Other applications 128 can be included as desired.

The NDVR control center 134 is connected to a distribution network 138. According to one embodiment, the NDVR control center 134 provides NDVR functionality to one or more headends or similar regional distribution centers over distribution network 138. In this manner, the one or more headends pass control commands from their clients to the NDVR control center, which in turn supplies the NDVR functionality that a given client is requesting. Alternatively, any given headend in a video asset distribution system may include the components of the NDVR control center 134. According to this embodiment, the distribution network 138 includes a number of clients, each typically including a set top terminal or other network access device such as a personal computer, with the NDVR control center 134 providing NDVR functionality directly to the clients. Distribution network 138 could be a communications network such as, for example, a cable television network (or other content network), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA), and the like.

The video server 132 receives control requests, e.g., play, pause, fast forward, rewind, etc., from clients over the distribution network 138 and performs an appropriate action. The video server 132 works in conjunction with other components of the NDVR control center 134 to deliver programming to clients over the distribution network 138. The video server 132 also receives control commands from clients, which are interpreted by logic at the video server to provide the response that the client is requesting. By way of example, when the client is watching live television and sends a pause control command over the network, the video server pauses the delivery of video data when it receives and interprets the control command.

In some instances, actions such as a pause command during a live program, or starting playback of a previously record program, may create a new "avail," in response to which, the video server 132 sends a request for an advertisement to an advertisement management system (ADM) 120.

Advertisers 136 may utilize an advertisement selection system (ADS) 104 to target advertisements in response to a request for fulfillment of an avail. The ADS 104 provides functionality that allows for selection of targeted advertising through both internal functionality and links to external advertisement targeting systems. When an advertiser 136 uses its pitcher 112b to transmit new advertising content to the NDVR control center 134, the ADM 120 must notify the given advertiser's ADS 104 of the new content arrival and provide a content directory for the new content. Similarly, when an advertisement is out of date or otherwise no longer needed, the ADS 104 requests the ADM 120 to delete the advertisement. Advertisers that provide NDVR advertisements to clients preferably also register with the ADM 120, in addition to transmitting the advertisement's video assets and metadata to the NDVR control center 134 for persistent storage in the content storage 122 data store. Accordingly, there may be a plurality of advertisers 136 in communication with the NDVR control center 134 at any given time.

In some instances, each advertiser purchases the rights to NDVR avails that occur during a given session. The ADM 120 contacts one or more appropriate ADS 104 on the basis of the advertiser that owns the avails or the service being requested. For example, the ADM 120 maintains a matrix, map or other data structure that stores and correlates programs with advertisers, which is accessed and queried by the ADM 120 to identify one or more appropriate ADS 104 to serve advertisements for a given program. Furthermore, different ADS systems 104 may provide different avail types, for example, one ADS may register with the ADM 120 to provide pause advertisements while another ADS may provide only bumper or replacement ads.

The ADM 120 receives the request for one or more advertisements from the video sever 132, optionally checking a rights management database to determine if additional advertising can be added, and transmits an advertisement request to an advertisement selector system (ADS) 104 that an advertiser 136 operates. Once the ADM 120 identifies one or more appropriate ADS(s) 104 to serve NDVR avails, the ADM 120 passes an avail request to the identified ADS(s) 104. The avail request may consist of a number of pieces of data regarding the client and the program that the client is currently displaying including, but not limited to, the IP address or other Layer 2 address of the client, the MAC or other Layer 3 address of the client, the identifier of the client's PRIZM cluster (market segmentation system available from Claritas Inc. of San Diego, Calif., USA, ZIP or ZIP+4 code, current program being viewed, channel, time, etc. The ADS 104 uses the information in the avail request to select one or more advertisements that the ADM 120 should instruct the video server 132 to play in response to the NDVR avail. The ADS 104 returns one or more unique identifiers to the ADM 120, which the ADM 120 uses to identify advertisements in the content storage 122 that the video server 132 is to play back in response to the NDVR avail; the identified advertisements are used as a part of a playlist. The ADM 120 does not provide the ADS 104 or any other third party with any personally identifiable information in violation of Federal law, e.g., 47 U.S.C. §551, et seq. (or similar provisions in other jurisdictions).

At this point, it should be noted that a "playlist" may refer to both the representation (code) that specifies a list of material to be played, as well as the actual video and audio of the material. In one or more embodiments, the representation of the material may be sent to a client in-band over a video content network, out-of-band over a video content network, or via a different network, as will be discussed further below. For simplicity, the simple notation "playlist" is used in most cases herein, and the skilled artisan will appreciate from the context the sense in which "playlist" is used.

In addition to transmitting a request to the ADM 120 for an advertisement in response to an NDVR avail, the video sever 132 informs a reporting system 130 that it is about to play an advertisement in response to an NDVR avail. As the video server 132 begins playing the advertisement, the reporting system 130 is in communication with the video server 132 over the communication bus 126 to trap for any subsequent commands that the client is transmitting to the video server. Put another way, the reporting system is observing the video server to determine and record what percentage of a given advertisement the video server is playing for the client in addition to any "trick play" control commands, e.g., fast forward and rewind, which the user may issue during the playback of a given piece of content.

The reporting system 130 also collects information regarding the client including the IP address or other Layer 2 address of the client, the MAC or other Layer 3 address of the client, the identifier of the client's PRIZM cluster, ZIP or ZIP+4 code, current program being viewed, channel, time, etc. The reporting system 130 maintains the client viewing information in a data store, such as a relational database, which it may analyze across a number of clients for a given advertisement, over a set of advertisements from a given advertiser 136 or according to other well-known permutations. This information is owned by the NDVR control center, which is responsible for determining what information is stored; according to one embodiment only aggregate data is compiled and released for verification and analysis purposes.

The reporting system 130 may transmit various combinations of raw and processed aggregate viewing information to both programmers 102 and advertisers 136 as defined by their business relationships. The reporting system 130 provides advertisers with a wide amount of information regarding the number of advertisements that they are delivering and the percentage of those advertisements that clients are watching, in addition to the manner in which they are being viewed. In this manner, advertisers can enter into agreements with the operator of the NDVR control center 134 to allow for compensation for providing advertisements in response to NDVR avails, which may be based on the number of avails fulfilled, the percentage of an advertisement that clients actually watch, or other metrics that the reporting system 130, programmer 102 or advertiser 136 calculate from the data that the reporting system 130 is collecting. Accordingly, programmers 102 may also use this information as an input to the campaign management tool 106 to gauge the effectiveness of a given campaign. It should be noted, however, that the reporting system 130 is designed to provide only aggregate information to third parties and not specific information regarding the viewing habits of a given client.

According to another aspect, the video server 132 requests the generation of a playlist when a client requests a program. The playlist is a listing of content that the ADM 120 arranges as a single entity or data structure. The video server 132 sends the playlist request to the ADM 120 for the determination of the number of and selection of pause and bumper advertisements, e.g., NDVR avails. The ADM 120 selects an appropriate ADS 104 that applies one or more algorithms to select one or more advertisement identifiers to fulfill a number of anticipated NDVR avails. On the basis of the advertisement identifiers that the ADM 120 receives, it constructs a playlist that includes references to the NDVR advertisements that the ADS 104 selects in conjunction with the program that the client requests. The ADM 120 may have several specialized ADS systems that are used to select default advertisements or local advertisements based on previously defined schedules or lists of assets.

In one or more non-limiting embodiments, the ADM 120 returns the playlist to the video server 132, which transfers same to client 140. An agent (an appropriate piece of software) on client 140 (such as a set-top box) executes the playlist and, based (for example) on interaction with the user, requests appropriate content from storage 122 (or elsewhere) via network 138 and server 132, it being understood that in one or more embodiments, client 140 may be a so-called "thin client" and the server 132 and/or ADM 120 may drive the process of putting the playlist together.

As noted, in some instances, the ADM 120 returns the playlist to the video server 132, which transfers same to client 140. In other cases, however, different functionality can be employed. ADM 120, in addition to returning the playlist to the video server 132, may also update the playlist on the video server 132. Further, components other than the video server may transfer the playlist to the client (and update same), whether in-band or out-of-band. Examples include a cable modem and/or any appropriate component(s) that can transfer the playlist to the client 140, update the view of the playlist, and allow the client to act on the playlist.

Consider, for example, three forms of content, each of which may have separate but identifiable producers: (i) linear—typically broadcast, (ii) on demand, and (iii) interactive—for example, the result of the "authoring tool" 202 of FIG. 2 (discussed below). The content can be delivered, for example, in two ways: (i) broadcast, and (ii) unicast.

The third form of content, interactive, can be combined with the other forms of content, and such "combining" can occur, for example, in three places: (i) at or prior to the producer (for example, programmer 102), (ii) at the cable multi-service operator (MSO) (for example, the operator of control center/head end 134), and (iii) at the client 140. Depending on where it was combined, delivery of the interactive component relative to the content can be done, for example, in two ways: (i) in band—embedded in the content (early or pre-combine), and (ii) out of band—outside the content but merged at some "later" point such as at the MSO or on the client (late-combine).

One or more embodiments of the invention advantageously combine the interactive component (playlist) with the correct piece of content at the right time, optionally adding some data to the interactive component from yet another source. The interactive component can be delivered, added (combined) or removed at any stage (provider such as 102, MSO, or client) where each content form may have arrived from different sources. Thus, it should be appreciated that FIGS. 1 and 2 show but one of many ways in which the interactive component can be delivered, added (combined) or removed.

Several non-limiting examples will now be set forth. In a "pre-combine" case, a producer, for example, Cable News Network (CNN) inserts an interactive advertisement (or other interactive application) into the broadcast stream and broadcasts the live linear stream via satellite to MSOs around the world. Depending on the business arrangement, the MSO may "strip" the interactive application before allowing the stream (broadcast) to be delivered to the client, or may allow the interactive application to pass-through and essentially be delivered "in-band" to the client.

In a "late-combine" case, a producer, such as CNN, inserts an advertisement into the broadcast stream and broadcasts the live linear stream via satellite to MSOs around the world. Producer "Interactive Co." (a hypothetical third party source of interactive ads) ftps (that is, sends using file transfer protocol) creatives to MSOs, and depending on the business arrangement, the MSO may add the interactive application before allowing the stream to be delivered (in-band) to the client.

In a "late combine out of band" case, producer CNN inserts an advertisement into the broadcast stream and broadcasts the live linear stream via satellite to MSOs around the world. Producer "Interactive Co." ftps creatives to MSOs, and depending on the business arrangement, the MSO may deliver the interactive application out-of-band using a carousel (see element 204 in FIG. 2)—allowing the stream to be delivered to the client and having the client "combine" the application and the content.

In yet another non-limiting example, producer CNNOD (exemplary of an on-demand cable news service) delivers an on-demand asset Y via satellite to MSOs around the world. Producer "Interactive Co." ftps creatives to MSOs. Producer "Ads Co." (a hypothetical third party source of ads) ftps creatives to the MSOs. User X plays on-demand asset Y, at which point the MSO obtains some additional data, and depending on the business arrangement, the MSO may "add" the application to Y with the additional data relevant for user X before allowing the stream (unicast) to essentially be delivered "in-band" to the client, but late-combining the application and data to the content relative to the provider. The session that was established for user X can be enhanced with advertisements or other forms of content in the form of a playlist that the MSO "combines" and an interactive component (for example, playlist descriptions) in-band so the client eBIF agent knows the structure. The MSO, optionally based on subscriber X's response, may add more content, for example, ads (from "Ads Co." or somewhere else), or other forms of content (perhaps from "Interactive Co.") to the playlist, and may combine a new eBIF description (eBIF from MSO) of the playlist in the stream. Once the user X tries to establish a session, a playlist might be built that had two bumpers and a pause ad (from "Ads Co.") and an injected eBIF playlist description (created, for example, by the MSO, on the fly) instructing the client to "skip" the pause ad and start playing with the bumper ad. Should user X pause, the eBIF agent would "jump" to the pause ad, and so on.

There are many more permutations; the preceding examples are for illustration and not limitation. Further, in each of the examples, or in other instances, the eBIF agent can be permitted to send response data back. Thus, there are many possible ways to deliver and merge the content and interactive components. In the last example, the system is sending down (late-combining) "updates" to the playlist in-band as the stream is playing out, using content that may come from a variety of producers.

Each client 140 utilizing the functionality of the NDVR control center 114 has a physical interface for connecting to the distribution network 138, e.g., a coaxial connection. Typically, the client device 140, which may be embodied in a set top box or set top terminal, contains a programmable microprocessor 142 for executing program code that a user loads via an input/output ("I/O") interface 146 or that the client 140 receives over the distribution network 138. The I/O interface includes both physical and software I/O functionality that the client 140 provides, for example, a coaxial interface to the distribution network 138, and infrared interface for receiving signals from a remote device 150, a smartcard reader for reading and writing to smartcard media, etc. The client 140 also maintains a codec 148 for decoding audio and video data that it receives from the NDVR control center 114 via the distribution network 138. As is well known to those of skill in the art, the client 140 may implement the codec 148 in hardware or as software that the storage component 144 maintains. Furthermore, the storage component 144, in addition to storing software, may provide storage for video content, such as advertisements, audio and still image data. The client 140 may also include another network connection to another network (not shown) for purposes of obtaining the playlist.

The NDVR control center builds a playlist to control the video that is part of the program, e.g., the client requested program and one or more pieces of advertising content. As noted above and explained in greater detail herein, the playlist is provided to client 140 for execution thereon. Encoded content is delivered to the client and is decoded by the client's audio and video decoding component for display on a display device. As the NDVR control center delivers encoded content, it marks the Network Play Time (NPT) point in the playlist for the video that it is delivering at any given time. As the client decodes and displays video on the display device, e.g., the client watches the program, a routine continually listens for program control signals from the client that the user executes to control the manner in which is video is displayed, for example, pause, rewind, advance, etc.

Program control at the NDVR control center forks depending on the specific command that the user issues to the client. Where the client issues a rewind or fast forward control command, the video rewinds or advances at an accelerated rate, and the content is delivered to the client for decoding and display. When the user issues a subsequent play command, the video returns to the normal playback rate, which is delivered to the client for decoding. Similarly, where the client issues a restart control command, the video advances to the NPT start point in the playlist for the program, from which point the NDVR control center delivers the content for decoding and display. Depending on the embodiment, the client may store the NPT index and pass the index to the video server with the control command. Note that, with respect to descriptors sent to the client, when the structure of the playlist is changed, the NPTs may change as well. Thus, while in some embodiments, the client may be "thin" and execute an agent with limited functionality, the agent is advantageously "smart" enough to keep track of changes in NPTs during rewind, fast forward, and the like.

In some instances, where the user issues a pause control command, the NDVR control center or client advances to or requests playback from the NPT point of a given advertisement for display as a pause advertisement. The client, in turn, displays a pause screen graphic on the display device. For example, the pause screen graphic may include instructions that tell the user to hit an "A" key on the remote control to view the pause advertisement and the play key to restart the program. Depending on the instructions that the client issues, the program either continues or the pause advertisement is played.

The NDVR control center also traps for other functionality that the system offers. For example, where the NDVR control center receives a camera angle control command, it advances to the NPT point in the playlist that contains or points to a program's alternate camera angle video, which it delivers to the client for decoding and display. Similarly, where the NDVR control center receives other control commands, it advances to the NPT point that contains or points to video content that is responsive to the received control command. The NDVR control center delivers content from the new NPT point, which the client decodes and displays. Alternatively, the client may have one or more well known or preconfigured NPT indexes and request the video server playback from a given NPT index upon receipt of a given control command. It should be appreciated by those of skill in the art that the just-described program flow, although presented in the context of a client accessing a remote NDVR control center, could be implemented with both components in a single device, such as in a set top box or terminal.

FIG. 2 is a block diagram 200 depicting enhanced television (ETV) features that may be employed with some aspects of the invention. An ETV application authoring tool 202 provides an application to data carousel stream generator 204, resulting in an eBIF application with ETV signaling and triggers (together specifying an inventive playlist); these are multiplexed together with program video and audio as shown at block 206. The resulting MPEG stream is provided to a platform 208 including an ETV user agent. Platform 208 can include, for example, a client 140 and an associated television set. User responses during interaction with platform 208 can be sent to an ETV application server 210 via an upstream communication in a network 138, which may be operated, for example, by an MSO. Tool 202 may be located, for example, at the facility of programmer 102, advertiser 136, within NDVR control center 134, or elsewhere (and may be included, for example, within tool 108 in FIG. 1). Stream generator 204 may be located in center 134. Application server 210 may be located in center 134 and connected to bus 126 or may be implemented within server 132, AMS 120, and so on.

It will be appreciated that the components in FIG. 2 could be located in a variety of other places. Embodiments of the invention may address linear broadcast and/or VOD (which may encompass time-shifted network digital video recorder (NDVR) content).

Content may be created, for example, at a provider like CNN, and may be carried by an MSO. In some instances, content may be received with a bundled embedded application. This may then be presented to the agent on the client. In cases where rights to the bundled embedded application have not been obtained, the bundled embedded application may be filtered out, for example, by the MSO. In other instances, embedded applications may be injected later by the MSO. Two typical scenarios are presented by way of example and not limitation: (i) interactive application is already bundled with content, either live or on-demand; and (ii) content is "married" with the interactive application at a later point. In this latter scenario, there may be two separate entities involved, for example, one entity produces the entertainment content or ad and one entity produces the interactive application. The material from the two entities may be "married" according to a contractual arrangement or other business arrangement. The "marriage" of the material may take place in the MSO's facility, or elsewhere.

Figure 3:
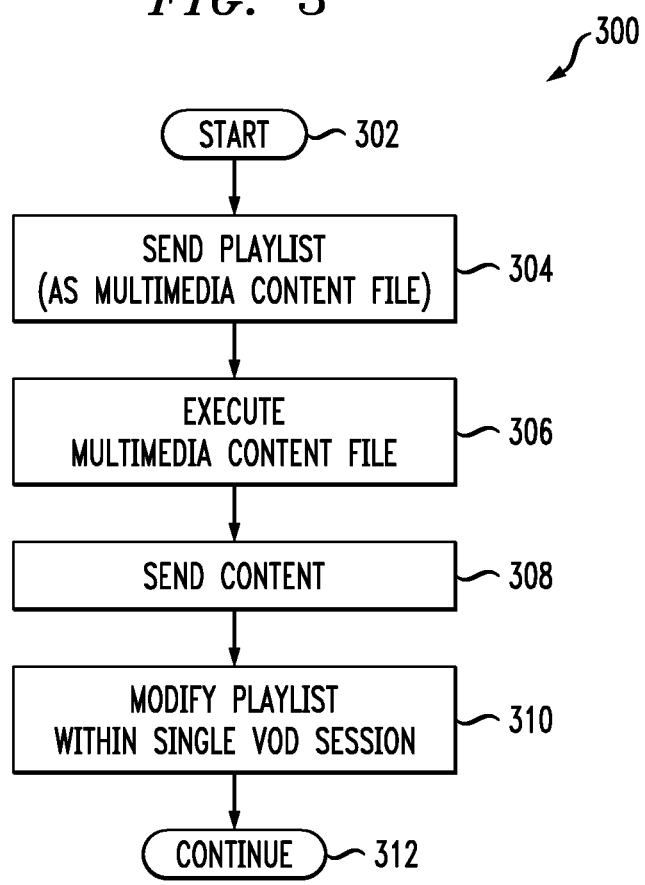
FIG. 3 is a flow chart of an exemplary method of providing programming content from a video server to a client over a video content network, according to another aspect of the invention.

FIG. 3 shows a flow chart 300 of exemplary method steps in a method, according to an aspect of the invention, for providing programming content from a video server, such as server 132, to a client, such as client 140, over a video content network, such as network 138. After beginning at block 302, at block 304, video server 132 sends to client 140 a playlist describing an interrelationship between at least one program segment and at least one related segment. The playlist may be sent over network 138, either in-band or out-of-band, or the playlist may be sent over a different network than the video content network. In some instances, the playlist is specified at least by a multimedia content file, for example, an enhanced television binary interchange format (eBIF) resource, which may, for example, be multiplexed with the video content. The aforementioned triggers are typically multiplexed with the video, but in general, may be sent in-band or out-of-band over the video content network, or over a different network than the video content network.

In some instances, step 306 is performed, wherein an agent, such as an ETV user agent on client 140, executes the multimedia content file. At block 308, server 132 sends video content including the at least one program segment and the at least one related segment to the client 140, for example, over network 138. Where step 306 has been performed, the video content may be sent, for example, in response to the agent executing the multimedia content file (which typically involves interactive user input).

At block 310, client 140 and server 132 cooperate to modify the playlist, via communication from the video server 132 to the client 140 over the video content network 138, either in-band or out of band, or by some other technique, such as another network. The modification of the playlist can include one or more of appending content to the playlist, pre-pending content to the playlist, inserting content into the playlist, removing content from the playlist, re-indexing content in the playlist, and so on. The steps of sending the playlist, at 304; sending the content, at 308; modifying the playlist, at 310; and, where performed, executing the file, at 306; are all accomplished within a single video-on-demand session. The terminology "within a single video-on-demand session per user" is employed herein, including the claims. This language covers the case where the steps are accomplished within a single video-on-demand session (for one or more users), as well as the case discussed below, wherein one playlist is used across two different sessions (for two different users; each individual user maintains his or her session).

In one or more embodiments of the invention, the playlist resides on the client 140 and the content resides on the VOD server 132 (content on the VOD server could, however, be augmented from other sources). In general, content can be chosen from a local or remote library, while keeping in session. For example, a user could obtain video from storage several states away and the system would advise the user when the content was available. Optionally, the user could be shown ads in the meantime. Again, content represented in the playlist may be in a number of different libraries, not necessarily just in the head end. In general terms, the playlist is a logical representation (code describing content) of a set of content relevant to one or more users in a session, that is, a set of content plus interaction rules.

Again, to reiterate, in some instances, a playlist can reference content across multiple content stores, which may not even be in same head end, and a playlist may also run across multiple users. In some instances, one playlist is used across two different sessions (for two different users; each individual user maintains his or her session). In such cases, streams addressing two different users may have slightly different data, for example, User A's stream "says" "User A" while User B's stream "says" "User B," even though both are watching the same program. Advantageously, ADM 120 may construct playlist(s) including context, time of day, client, what program is being watched, and so on, and may assemble and provision same onto the VOD system and indicate to VOD server 132 to prepare to play same to the client 140. Back end systems, such as element 106, may perform campaign management and assist in assembling the content.

Where eBIF is employed, the playlist is sent, in eBIF form, to an agent running on the client 140. The agent "knows" how to understand the description in the playlist, which describes, for example, the points where different items are located. Items in the playlist have offsets given in NPT.

The single video-on-demand session could include, for example, a viewer at the client navigating from at least a first program asset to at least a second program asset. That is, a single session is maintained even when switching from one program to another, e.g., "Monday Night Football" to "News at 10." In some instances, the single on-demand session may even be "micro-cast" to an addressable group (such as in a switched digital network); for example, as promotional material over a so-called "barker" channel. US Patent Publication 2003/0056217 A1 of Paul D. Brooks, entitled "Technique for Effectively Providing Program Material in a Cable Television System," is a non-limiting example of such a switched digital network, and is expressly incorporated herein by reference in its entirety for all purposes Processing continues at block 312.

It should be noted that in one or more instances of the invention, the playlist can be modified even while the at least one program segment and/or the at least one related segment are in the process of being acquired in real time by the video server 132. Further, it should also be noted that in one or more embodiments of the invention the playlist is further specified by stream events, also known as "eTriggers." In general, the triggers may be bound within the video stream, unbound, or delivered through some other mechanism. Further, in one or more embodiments, the eBIF data is transported along with the video inside the same transport "pipe," but is not actually part of the video per se.

In view of the discussion herein, it will be appreciated that an one aspect of the invention contemplates a system for providing video content and supplemental information. One exemplary embodiment of such a system includes one or more clients 140 and a module, such as ADM 120, configured to prepare a playlist describing an interrelationship between at least one program segment and at least one related segment. The module is also configured to facilitate sending the playlist to the client 140 (for example, via network 138 or a different network). The system also includes a video content network 138 coupled to the client 140, and a video server 132 coupled to the module 120 and the video content network 138 and configured to send, to the client 140, over the video content network, video content including the at least one program segment and the at least one related segment. Module 120 is configured to facilitate modification of the playlist. The sending of the playlist, the sending of the content, and the modifying of the playlist (including modifying the playlist on the client 140) are all accomplished within a single video-on-demand session per user.

One or more inventive embodiments employ eBIF multimedia content format defined by the open cable specifications. The skilled artisan is familiar with eBIF and eTriggers, and given the teachings herein, will be able to employ same to implement one or more embodiments of the invention. Furthermore, the following documents are expressly incorporated herein by reference in their entirety for all purposes:

(i) Enhanced Television (ETV) Overview, available at http://www.opencable.com/etv/etvoverview.html;
  (ii) Enhanced TV Operational Guidelines, OC-GL-ETV-OG-V01-060714, available at http://www.opencable.com/downloads/specs/OC-GL-ETV-OG-V01-060714.pdf;
  (iii) Enhanced TV User Interface Guidelines, OC-GL-ETV-UIG-V02-060418, available at http://www.opencable.com/downloads/specs/OC-GL-ETV-UIG-V02-060418.pdf;
  (iv) Enhanced TV Application Messaging Protocol 1.0, OC-SP-ETV-AM1.0-I02-050727-plus ECNs, available at http://www.opencable.com/downloads/specs/OC-SP-ETV-AM1.0404-070921.pdf; and
  (v) Enhanced TV Binary Interchange Format 1.0, OC-SP-ETV-BIF1.0-I04-070921, available at http://www.opencable.com/downloads/specs/OC-SP-ETV-BIF1.0-I04-070921.pdf The aforementioned related segments can include advertisements or other items, for example, biographies of program stars or other "bonus material." Examples of different types of advertisements include bumper ads ("BA"), pause ads ("PA"), telescoping ads ("TA"), local ads ("LA"), Fast Forward ads, Rewind ads, and the like.

Typically, the at least one program segment and the at least one related segment each have an associated continuation segment (unless at the end of the playlist). Further, many different program segments and/or related segments can be specified. For example, the video content may include at least a third segment, and the at least one program segment and/or the at least one related segment can have a choice point (this can be specified, for example, in NPT) permitting selection of the at least third segment. In such a case, the playlist can further describe an interrelationship between (i) the program segment and/or the related segment, and (ii) the third segment.

In at least some instances, the video content may include at least a first pause ad segment played when client 140 receives a pause command from remote control 150. In such a case, the playlist further describes an interrelationship between (i) the program segment and/or the related segment, and (ii) the first pause advertisement segment. This situation may also be referred to as a single rotation pause ad. There can be multiple rotation pause ads. For example, in some instances, the video content further includes at least a second pause advertisement segment played in a rotating fashion upon receipt of a pause command at the client (that is, play one ad responsive to the first pause command and rotate to another when a second pause command is received, and so on). In such cases, the playlist further describes an interrelationship between (i) the program segment and/or the related segment, and (ii) the second pause advertisement segment. This is an exemplary case of two rotation pause ads.

FIGS. 4A and 4B are a sample extensible markup language (XML) listing for an exemplary inventive playlist. The exemplary playlist includes 14 segments labeled "A" through "N." The types of segments are listed below (other types of ads such as bumper ads "BA" are not shown in this example but could of course be included):
PA=pause ad
TA=telescoping ad
C=segment of entertainment program
LA=local ad.

Each segment is specified by its starting point in terms of NPT and the corresponding timecode. For example, segment J, a "Scion" ad, has an NPT of 110000, which is 110,000 ms, or 110 s, or 1.833 minutes (1 minute 50.00 seconds). Each segment also has a title, as shown in FIG. 4A, for example, segment G is the first program segment of "TechTV's Cheat." Each segment has its own specification in the XML code. For example, as seen at 402 in FIG. 4B, segment J is a local ad starting at NPT 110000 and ending at NPT 120000, its identity is J, its name is LA2 (second local ad), and the ID of its continuation segment is K. It has a single rotation ad L.

Figure 5:
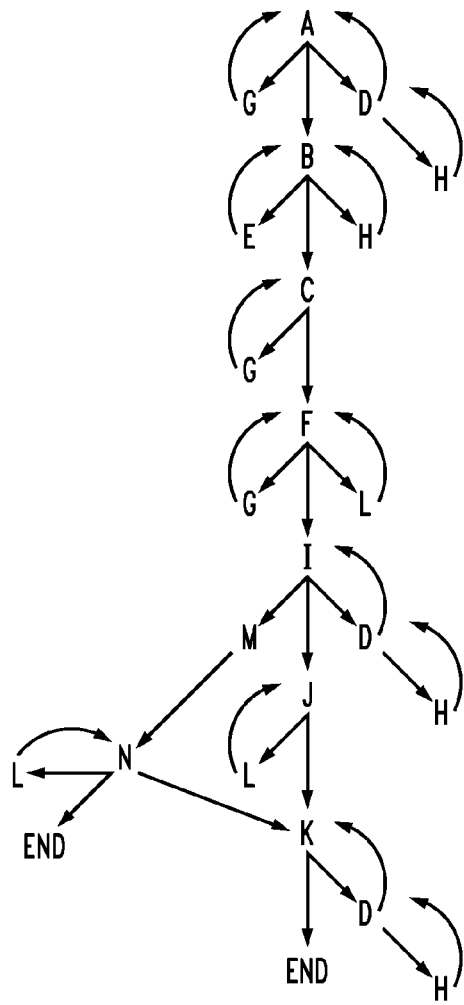
FIG. 5 presents an exemplary descriptive document and table corresponding to the playlist of FIGS. 4A and 4B.

Attention should now be given to FIG. 5, which presents an exemplary descriptive document and table for the inventive playlist of FIGS. 4A and 4B. In general, segments can include segments of programs, advertisements, and the like. A continuation segment is the segment that will follow a current segment if the user takes no action. A choice point may be presented at a given NPT index, where the user is given a choice to pick one or more segments in lieu of the current segment. Rotation pause ads may be presented when the user executes a pause function, and may rotate (or toggle) upon subsequent commands. Similar functionality can be provided upon other commands, such as fast forward or rewind. Further, alternative endings can be enabled with this type of functionality (refer, for example, to segments M and N as described below).

As shown in FIG. 5, segment A includes a first program segment P1, from time 0-20. If no action is taken by the user, flow simply continues to continuation segment B. There are two rotation pause ads, G and D; when a user executes a pause command with remote control 150, first ad G will be shown; upon a subsequent pause, ad D will be shown. It will be appreciated that the time designations do not necessarily correlate to the order in which segments will ultimately be viewed, since a user may make selections impacting how the content will be viewed.

Segment B includes a first local ad, LA1, from time 20-30. If no action is taken by the user, flow simply continues to continuation segment C. There is a choice point at time 25, wherein the user can select choice E or H. Segment C includes second program segment P2, from time 30-40. If no action is taken by the user, flow simply continues to continuation segment F. There is a single rotation pause ad, G; when a user executes a pause command with remote control 150, ad G will be shown.

Segment D is a first rotation pause ad, PA1, from time 40-50. A choice point is presented at time 40, wherein segment H can be chosen. Segment E is a first telescoping ad, TEL 1, from time 50-60. Segment F includes third program segment P3, from time 70-80. If no action is taken by the user, flow simply continues to continuation segment L. There are two rotation pause ads, G and L; when a user executes a pause command with remote control 150, first ad G will be shown; upon a subsequent pause, ad L will be shown. Segment G is a second rotation pause ad, PA2, from time 80-90. Segment H is a second telescoping ad, TEL 2, from time 90-100.

Segment I includes fourth program segment P4, from time 100-110. If no action is taken by the user, flow simply continues to continuation segment J. A choice point is presented at time 108, wherein segments J or M can be chosen. There is a single rotation pause ad, D; when a user executes a pause command with remote control 150, ad D will be shown. Segment J includes a second local ad, LA2, from time 110-120. If no action is taken by the user, flow simply continues to continuation segment K. There is a single rotation pause ad, L; when a user executes a pause command with remote control 150, ad L will be shown.

Segment K includes fifth program segment P5, from time 120-130. If no action is taken by the user, flow simply continues to the end. There is a single rotation pause ad, D; when a user executes a pause command with remote control 150, ad D will be shown. Segment L is a third rotation pause ad, PA3, from time 130-140. Segment M includes sixth program segment P6, from time 140-150. If no action is taken by the user, flow simply continues to segment N. Segment N includes seventh program segment P7, from time 150-160. If no action is taken by the user, flow simply continues to the end. A choice point is presented at time 155, wherein segment K can be chosen. There is a single rotation pause ad, L; when a user executes a pause command with remote control 150, ad L will be shown. Segments M and N thus lead to an alternative ending that can be chosen by the user.

It will be seen that the rotation ads and telescoping ads D, E, G, H and L, do not have continuation segments, but send the flow back to the preceding segment, as indicated by the curved arrows in FIG. 5. Playlists as shown and described with regard to FIGS. 4A and 4B, or FIG. 5, can be updated within a single session, even while the viewer watches real-time-acquired content. This can be done, for example, by sending a new eBIF description of the revised playlist (with corresponding eTriggers, as appropriate) from control center 134 to client 140 over network 138 (or another network).

Content may include in-band content plus so-called triggers; in some instances, multiplexed with MPEG 2 video and audio. Other exemplary embodiments are discussed elsewhere herein. The triggers can be used for enhancing eBIF resources; applications on clients 140 are able to handle the triggers and associated data. Navigation is possible within the playlist stream, and bound and/or unbound applications may be provided along with data. The playlist can be modified within a single session, for example, a server-side session. One or more inventive embodiments enable creation of a single on demand session, with the viewer being kept in the session no matter how he or she navigates and watches TV. This inventive approach is believed to be advantageous, inasmuch as session deletion and creation is a complex process that takes significant time. One or more embodiments of the invention allow the viewer to seamlessly navigate content on an on demand server as if it was all available in the session. This includes content that is being real-time acquired.

Thus, in one or more embodiments, eBIF technology gives the client 140 a "snapshot" of the playlist. In essence, a dynamic, customer-tailored experience can be provided to each person viewing a stream. Enrichment can be provided, for example, by appending the next program after an invocation of so-called start-over functionality, as known from prior patent publications. The following two US Patent Publications are incorporated by reference herein, in their entirety, for all purposes: US2003/0208767 A1 of Williamson et al., entitled "Network based digital information and entertainment storage and delivery system," and US2005/0034171 of Benya, entitled "Technique for delivering programming content based on a modified network personal video recorder service." A non-limiting example of such enrichment includes watching an episode of a situation comedy with the just-mentioned start-over functionality. A user may start watching while the situation comedy is in progress and may finish in real time, and may be prompted whether he or she wishes to remain time-shifted, for example, to watch a delayed version of the news. If the user elects to do this, the news program can simply be appended to the playlist and the user can remain within the single session.

When the playlist is created, choices may be provided to tie in character biography video(s) or similar "extras". With eBIF, a menu-ing structure can be provided to enable the user to jump within the video stream. Another non-limiting example of playlist modification includes appending more and more music to a playlist. Further, as noted, changes need not be sequential; it is possible to re-index, insert, add, pre-append (prepend) onto the stream in or out of band. Interactive advertisements can be provided and trick modes (i.e., fast forward, pause, and rewind) can be dynamically controlled. The user need not necessarily see any appended content unless he or she chooses to watch it.

Thus, one or more embodiments provide an enhanced viewer experience using VOD playlist technology, an eTV user agent, and dynamically inserted eBIF instructions. In one aspect, a method of viewing on-demand content implements an appendable playlist using the Cablelabs eTV interactive TV format (eBIF and eTriggers). Programming instructions, in the form of eBIF and eTriggers are sent with the video to the set top in an on demand context. The information can be pre-multiplexed into the video and/or multiplexed in by a filtering/carousel/spooler device 204 on the output of the VOD server 132. The eBIF client on the set top 140 responds to these instructions, allowing the set to automatically or under user control alter the viewing direction or experience. The eTV in-band forward and out-of-band return paths may, but are not required to, utilize opportunistic data insertion.

One or more embodiments of the invention may be useful in one or more of the following products and services:
1) TV programming guides
2) VOD guide(s)
3) Box art or mosaic guides
4) User selected and/or directed programming paths
5) Telescoping advertisements
6) switched digital video unicast with fast channel change, network PVR and addressable advertising.

Embodiments of the invention advantageously reduce or eliminate the need create, tear down, and recreate sessions, as a session can be created for each given user and used continuously for that user's entire viewing session.

Figure 6:
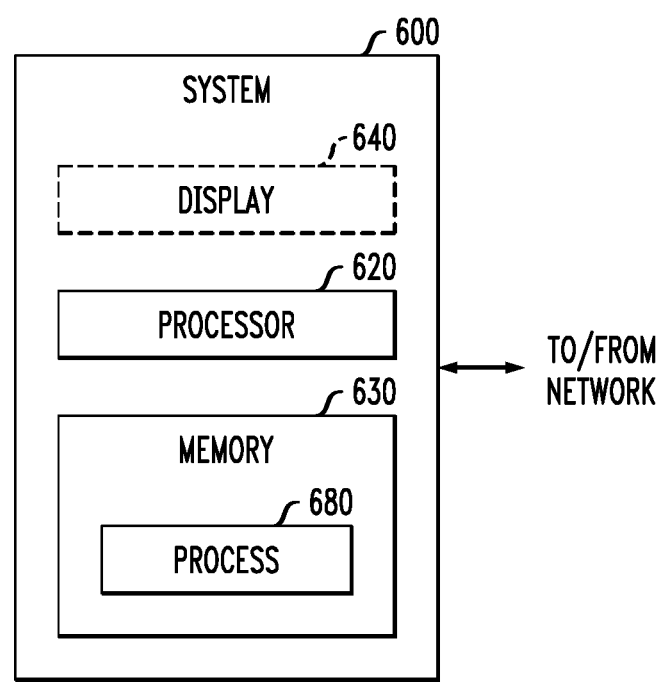
FIG. 6 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps. FIG. 6 is a block diagram of a system 600 that can implement part or all of one or more aspects or processes of the present invention, processor 620 of which is representative of processors (such as those in control center 134 or client 140) depicted in the other figures. In one or more embodiments, inventive steps are carried out carried out by one or more of the processors in conjunction with one or more interconnecting network(s). As shown in FIG. 6, memory 630 configures the processor 620 to implement one or more aspects of the methods, steps, and functions disclosed herein (collectively, shown as process 680 in FIG. 6). The memory 630 could be distributed or local and the processor 620 could be distributed or singular. The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices.

System and Article of Manufacture Details

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing programming content from a video server to a client coupled to said video server by a video content network, said method comprising the steps of:
    sending, to said client, a playlist describing an interrelationship between first and second segments;
    sending, from said video server to said client over said video content network, video content comprising said first and second segments; and
    modifying said playlist via communication to said client;
    wherein said steps of sending said playlist, sending said content, and modifying said playlist are all accomplished within a single video-on-demand session per user; and
    wherein said single video-on-demand session comprises a viewer at said client navigating from at least a first program to at least a second program.

2. The method of claim 1, wherein at least one of said first and second segments is acquired in real time by said video server during said modifying step.

3. The method of claim 1, wherein:
    said playlist is sent from said video server to said client, over said video content network;
    said playlist is specified at least by a multimedia content file multiplexed with said video content; and
    said playlist is modified via communication from said video server to said client, over said video content network.

4. The method of claim 3, wherein said playlist is further specified by stream events.

5. The method of claim 4, wherein said stream events are multiplexed with at least one of said first and second segments.

6. The method of claim 4, wherein said stream events are sent from said video server to said client, out-of-band, over said video content network.

7. The method of claim 4, wherein said stream events are sent from said video server to said client over a network other than said video content network.

8. The method of claim 3, further comprising executing said multimedia content file using an application on said client.

9. The method of claim 1, wherein:
said video content further comprises at least a third segment;
at least one of said first and second segments has a choice point permitting selection of said at least third segment; and
said playlist further describes an interrelationship between (i) said first and second segments, and (ii) said at least third segment.

10. The method of claim 1, wherein:
said video content further comprises at least a first pause advertisement segment played upon receiving a pause command at said client; and
said playlist further describes an interrelationship between (i) at least one of said first and second segments, and (ii) said first pause advertisement segment.

11. The method of claim 10, wherein:
said video content further comprises at least a second pause advertisement segment played in a rotating fashion upon receiving the pause command at said client; and
said playlist further describes an interrelationship between (i) said first and second segments, and (ii) said second pause advertisement segment.

12. The method of claim 1, wherein said playlist is sent from said video server to said client, in-band, over said video content network.

13. The method of claim 1, wherein said playlist is sent from said video server to said client, out-of-band, over said video content network.

14. The method of claim 1, wherein said playlist is sent from said video server to said client over a network other than said video content network.

15. The method of claim 1, wherein said step of modifying said playlist comprises appending material to said playlist, said material appended to said playlist corresponding to said at least second program, wherein said first segment corresponds to said first program.

16. The method of claim 1, wherein said second segment comprises at least one of a bumper ad, a pause ad, a telescoping ad, a local ad, a fast forward ad, a rewind ad, a biography of an actor, and bonus material.

17. The method of claim 1, wherein said video server is located in a head end, and wherein at least some of said video content sent to said client over said video content network is stored externally to said head end.

18. A system for providing video content and supplemental information, comprising:
a client;
a module configured to prepare a playlist describing an interrelationship between first and second segments, said module also being configured to facilitate sending said playlist to said client;
a video content network coupled to said client; and
a video server coupled to said module and said video content network and configured to send, to said client, over said video content network, video content comprising said first and second segments;
wherein said module is configured to facilitate modification of said playlist, and wherein said sending of said playlist, said sending of said content, and said modifying of said playlist are all accomplished within a single video-on-demand session per user; and
wherein said single video-on-demand session comprises a viewer at said client navigating from at least a first program to at least a second program.

19. The system of claim 18, wherein said video server is configured to acquire, in real time, at least one of said first and second segments, during said modifying of said playlist.

20. The system of claim 18, wherein:
said playlist is sent from said video server to said client, over said video content network;
said playlist is specified at least by a multimedia content file multiplexed with said video content; and
said playlist is modified via communication from said video server to said client, over said video content network.

* * * * *